United States Patent [19]
Yamamura et al.

[11] Patent Number: 5,954,119
[45] Date of Patent: Sep. 21, 1999

[54] HEAT ACCUMULATOR

[75] Inventors: Yoshihiro Yamamura, Nagoya; Hiroyuki Oyama, Susono, both of Japan

[73] Assignee: Toyota Jidosha Kabushiki Kaisha, Japan

[21] Appl. No.: 08/944,968

[22] Filed: Oct. 7, 1997

Related U.S. Application Data

[63] Continuation of application No. 08/492,635, Jun. 20, 1995, abandoned.

[30] Foreign Application Priority Data

Jun. 21, 1994 [JP] Japan .................................. 6-138673

[51] Int. Cl.⁶ .................................................... F28D 17/00
[52] U.S. Cl. ................. 165/10; 126/263.03; 126/263.01
[58] Field of Search ........................ 165/10; 126/263.03, 126/263.01, 263.04

[56] References Cited

U.S. PATENT DOCUMENTS

| | | | |
|---|---|---|---|
| 2,289,425 | 7/1942 | Hogan | 126/263.03 |
| 3,527,201 | 9/1970 | Epstein | 126/263.01 |
| 3,725,153 | 4/1973 | Schröder et al. | 126/263.01 X |
| 4,077,390 | 3/1978 | Stanley et al. | 126/263.04 |
| 4,303,121 | 12/1981 | Pangborn | 126/263.01 X |
| 4,503,838 | 3/1985 | Arrhenius et al. | 126/263.03 |
| 4,829,980 | 5/1989 | Smith | 126/263.04 |
| 4,850,424 | 7/1989 | Mitani et al. | 126/263.03 X |
| 4,977,953 | 12/1990 | Yamagishi et al. | 126/263.01 X |
| 5,056,589 | 10/1991 | Hettel et al. | 126/263.04 X |
| 5,082,582 | 1/1992 | Ames et al. | 165/10 X |

FOREIGN PATENT DOCUMENTS

| | | |
|---|---|---|
| 3 034 608 | 4/1982 | Germany . |
| 3 521 548 | 2/1986 | Germany . |
| 58-168892 | 10/1983 | Japan . |
| 63-230784 | 9/1988 | Japan . |
| 2-31913 | 2/1990 | Japan . |
| 5-96769 | 12/1993 | Japan . |
| 659 955 | 3/1987 | Switzerland . |
| 987328 | 1/1983 | U.S.S.R. ............................ 126/263.04 |
| 2123948 | 2/1984 | United Kingdom .............. 126/263.01 |

OTHER PUBLICATIONS

European Search Report dated Sep. 5, 1995 (2 pages).
Communication dated Sep. 28, 1995 (1 page).
Information List (Form 1).

*Primary Examiner*—Ira S. Lazarus
*Assistant Examiner*—Christopher Atkinson
*Attorney, Agent, or Firm*—Finnegan, Henderson, Farabow, Garrett & Dunner, L.L.P.

[57] ABSTRACT

A heat accumulator for storing latent heat wherein said latent heat is evolved by applying an electric voltage. The heat accumulator comprises a heat storage material, a pair of spaced electrodes consisting of an anode and a cathode disposed inside said heat storage material, a means to maintain seed nuclei for inducing crystallization of supercooled state of heat storage material in order to evolve latent heat, and a means for applying an electric voltage between said anode and cathode.

7 Claims, 13 Drawing Sheets

Fig.18

HEAT ACCUMULATOR

This application is a continuation, of application Ser. No. 08/492,635, filed Jun. 20, 1995, now abandoned.

BACKGROUND OF THE INVENTION

1. Field of the Invention

The present invention relates to a heat accumulator, and more particularly to a heat accumulator which destroys a supercooled state of a heat storage material consisting of a liquid exhibiting a supercooled state, by applying a voltage to the heat storage material, and is capable of evolving latent heat from the heat storage material.

2. Description of the Prior Art

A heat accumulator which uses a liquid exhibiting a supercooled state such as sodium acetate trihydrate as a heat storage material, destroys the supercooled state by applying a voltage through electrodes, and evolves latent heat stored in the heat storage material is known (for example, see Japanese Unexamined Utility Model Publication No. 5-96769). In such a heat accumulator, the heat storage material receives heat from a high temperature medium and stores the heat. When its contact with the high temperature medium is inhibited or it is brought into contact with a low temperature medium, the temperature of the heat storage material drops gradually. Even when the temperature of the heat storage material falls below its freezing point, for example about 58° C. in the case of the sodium acetate trihydrate, the heat storage material does not solidify, that is, enters a supercooled state. In this manner, the latent heat is accumulated in the heat storage material.

It is known, on the other hand, that solidification of the heat storage material can be promoted by destroying the supercooled state of the heat storage material by generating nuclei in the heat storage material in a supercooled state. Therefore, in the heat accumulator described above, the seed nuclei are aggregated by applying a voltage so as to destroy the supercooled state of the heat storage material, and solidification of the heat storage material is promoted by generating the nuclei in the heat storage material so as to thereby evolve the latent heat stored in the heat storage material. Heat evolution can thus be attained quickly by applying the voltage at any point of time while the heat storage material remains in a supercooled state.

When the nuclei are generated in the heat storage material by applying the voltage to the heat storage material in a supercooled state as in the heat accumulator described above, the nucleation in the heat storage material occurs on the anode surface. If the sodium acetate trihydrate is used as the heat storage material as in the heat accumulator described above, on the other hand, the heat storage material in the liquid phase is alkaline. Therefore, when the voltage is applied to this heat storage material, hydroxide ions (OH⁻) in the heat storage material migrate to the anode. Then, an oxide layer is formed on the anode surface due to the electrochemical reaction, and this oxide layer is laminated on the anode surface to form a plurality of layers after applying the voltage to the heat storage material repeatedly. As a result, the seed nuclei disappear on the anode surface, and the nucleation function on the anode surface gradually decreases.

To solve this problem of the decrease of the nucleation function as the result of the formation of the oxide layers, the above prior art reference proposes to fit a supplementary member comprising a screw and a nut to the anode, to restrict the oxidation reaction by these members and to improve durability. However, even in such an accumulator, the oxide is deposited in the gap between the electrode and the screw and nut, and this accumulator is not yet entirely satisfactory.

Regarding heat accumulators applied to automobiles, the temperature of the engine cooling water is generally 95° C. and sometimes exceeds 100° C. at the time of a high engine load, such as driving on an upward slope, high speed driving and the like. In such a case, the prior electrode for nucleation loses its nucleation function, and nucleation does not occur even if the voltage is applied to the supercooled state. This is because the seed nuclei (clusters) for nucleation retained on the electrode surface become completely molten at a high temperature. This disappearance of seed nuclei at high temperatures has not been pointed out at all in the past.

The purpose of the present invention is to provide a heat accumulator which has a high degree of durability and is capable of withstanding high temperatures.

SUMMARY OF THE INVENTION

To attain the above and other objects of the present invention, in the first embodiment, there is provided a heat accumulator for storing latent heat wherein said latent heat is evolved by applying electric voltage comprising: a heat storage material exhibiting a supercooled state in which latent heat is stored; a pair of spaced electrodes consisting of an anode and a cathode disposed inside said heat storage material; laminate layers or winding structures, at least on a part of the surface of said anode, which are formed by a metal foil or wire and the layers of which are not bonded to one another and have seed nuclei on the surface; and means for applying an electric voltage between said anode and cathode.

Also, in the second embodiment, there is provided a heat accumulator for storing latent heat wherein said latent heat is evolved by applying an electric voltage comprising a heat storage material exhibiting a supercooled state in which latent heat is stored; a pair of spaced electrodes consisting an anode and a cathode disposed inside said heat storage material, said anode being composed of plurality of members having seed nuclei on the surface thereof, and further comprising a means for varying the pressing force for mutually pressing a plurality of said members to each other when the temperature of said heat storage material exceeds said predetermined temperature and separating said seed nuclei from said heat storage material; and means for applying electric voltage between said anode and cathode.

Also, in the third embodiment, there is provided a heat accumulator for storing latent heat wherein said latent heat is evolved by applying an electric voltage comprising a heat storage material exhibiting a supercooled state in which latent heat is stored; a pair of spaced electrodes consisting of an anode and a cathode disposed inside said heat storage material; means for separating said anode from said heat storage material when the temperature of said heat storage material exceeds a predetermined temperature, and; means for applying an electric voltage between said anode and cathode.

Further, in the forth embodiment, there is provided a heat accumulator for storing latent heat wherein said latent heat is evolved by applying an electric voltage comprising: a heat storage material exhibiting a supercooled state in which latent heat is stored; a pair of spaced electrodes consisting of an anode and a cathode disposed inside said heat storage material; means for cutting off the feed of heat to said heat storage material when the temperature of a medium for supplying heat to said heat storage material or the temperature of said heat storage material exceeds a predetermined temperature, and means for applying an electric voltage between said anode and cathode.

In the first embodiment, the laminate layers or winding structures which are formed by a metal foil or wire and the layers of which are not mutually bonded are disposed on a part on the anode of the heat accumulator. Therefore, when the oxide is formed on the anode surface, the metal constituting the anode is simultaneously eluted into the heat storage material as the result of a reaction of this metal and the heat storage material, and the periphery of the oxide is gradually eluted. Finally, the support of the anode position to which the oxide adheres is lost, and the oxide falls and peels off. Then, the thin layer of the next winding or laminate structure is exposed and the fresh anode surface appears. Accordingly, the seed nuclei always exist on the surface of the anode, and the nucleation function of the heat accumulator can be maintained.

In the second embodiment, by disposing the means for varying pressing force in the heat accumulator, a plurality of members constituting the anode are strongly pressed to each other at a high temperature, and the seed nuclei existing between these members are separated from the heat storage material under the high temperature state. Therefore, dissolution of the seed nuclei is prevented. When the temperature of the heat storage material drops, the force pressing the members to each other decreases and the seed nuclei are exposed to the heat storage material, and nucleation is possible.

In the third embodiment, by disposing the anode separation means for separating the anode from the heat storage material, the anode is separated from the heat storage material at above a predetermined temperature, and heat transfer to the anode is restricted. As a result, even when the heat storage material attains a high temperature, the anode does not attain the high temperature, and dissolution of the seed nuclei is prevented.

In the forth embodiment, by disposing a heat feed control means for cutting off the feed of heat to the heat storage material, over-heating of the heat storage material can be prevented, and dissolution of the seed nuclei can be prevented.

DESCRIPTION OF THE PREFERRED EMBODIMENTS

Hereinafter, the preferred embodiments of the present invention are explained by referring to the drawings.

EXAMPLE 1

Figure 1:
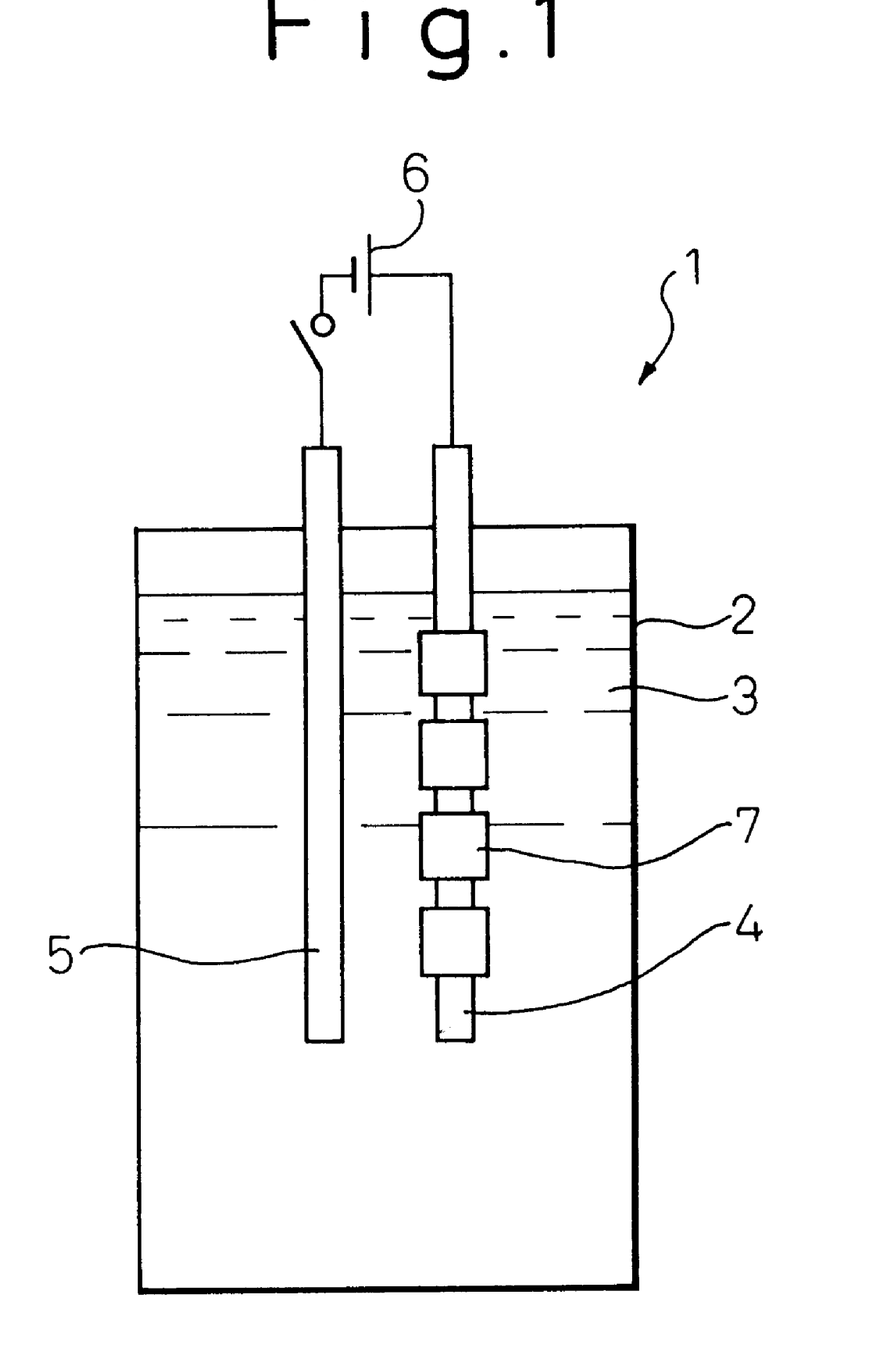
FIG. 1 is a schematic cross-sectional view of the heat accumulator with a thin layer of a metal tape on an anode rod.

Referring to FIG. 1, a heat accumulator 1 is equipped with a heat storage material 3 accommodated in a container 2. This heat storage material is mainly composed of sodium acetate trihydrate ($CH_3COONa.3H_2O$). As a heat storage material, various hydrates of salt, such as calcium chloride hexahydrate ($CaCl_2.6H_2O$), sodium sulfate decahydrate ($Na_2SO_4.10H_2O$), sodium carbonate decahydrate ($Na_2CO_3.10H_2O$), disodium hydrogenphosphate dodecahydrate ($Na_2HPO_4.12H_2O$), calcium nitrate tetrahydrate ($Ca(NO_3)_2.4H_2O$), sodium thiosulfate pentahydrate ($Na_2S_2O_3.5H_2O$), potassium alum dodecahydrate ($KAl(SO_4)_2.12H_2O$), and ammonium alum dodecahydrate ($NH_4Al(SO_4)_2.12H_2O$) may be used. An acid may be added to this heat storage material so as to inhibit the formation of an oxide layer as described below. When such an acid is added, water is added so as to stabilize the supercooled state of the heat storage material. An anode rod 4 and a cathode rod 5 are disposed in the heat storage material. These electrode rods 4 and 5 are connected to a D.C. power supply 6. In this embodiment, the anode rod 4 is made of silver, and to obtain a satisfactory nucleation function of the heat storage material 3, the anode rod 4 is made of a metal, preferably silver or a silver alloy. On the other hand, the cathode rod 5 need not be made of a metal so long as the material has conductivity. For example, carbon, and the like can be used. A metal tape 7 is wound on the anode rod 4.

Figure 2:
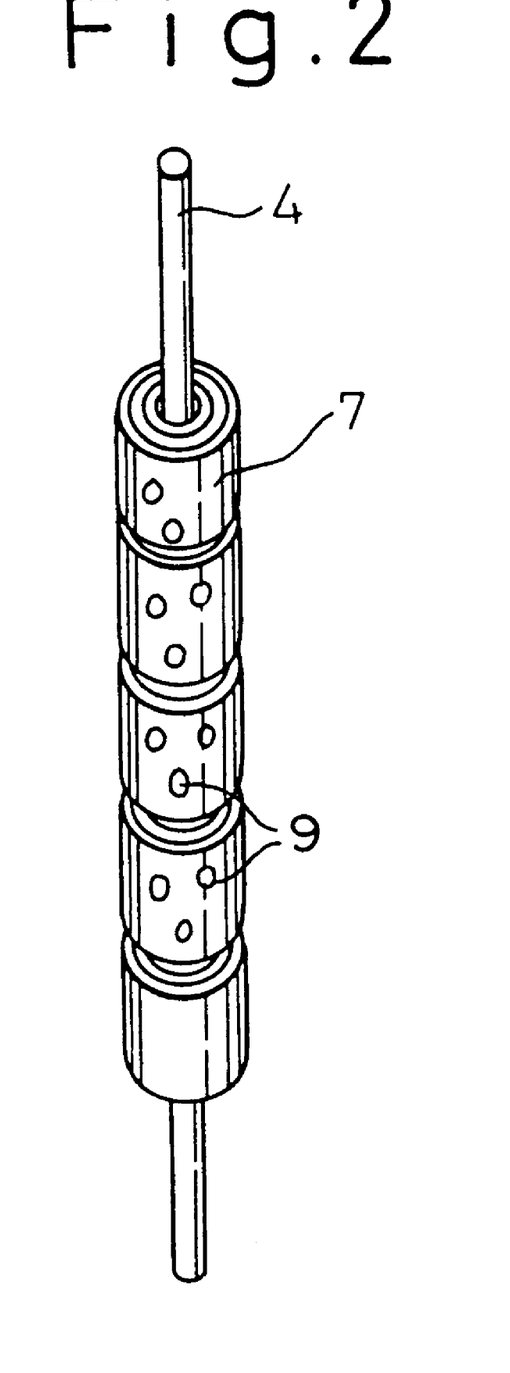
FIG. 2 is a schematic view of an anode equipped with a thin layer of a winding structure of a metal tape.
Figure 3:
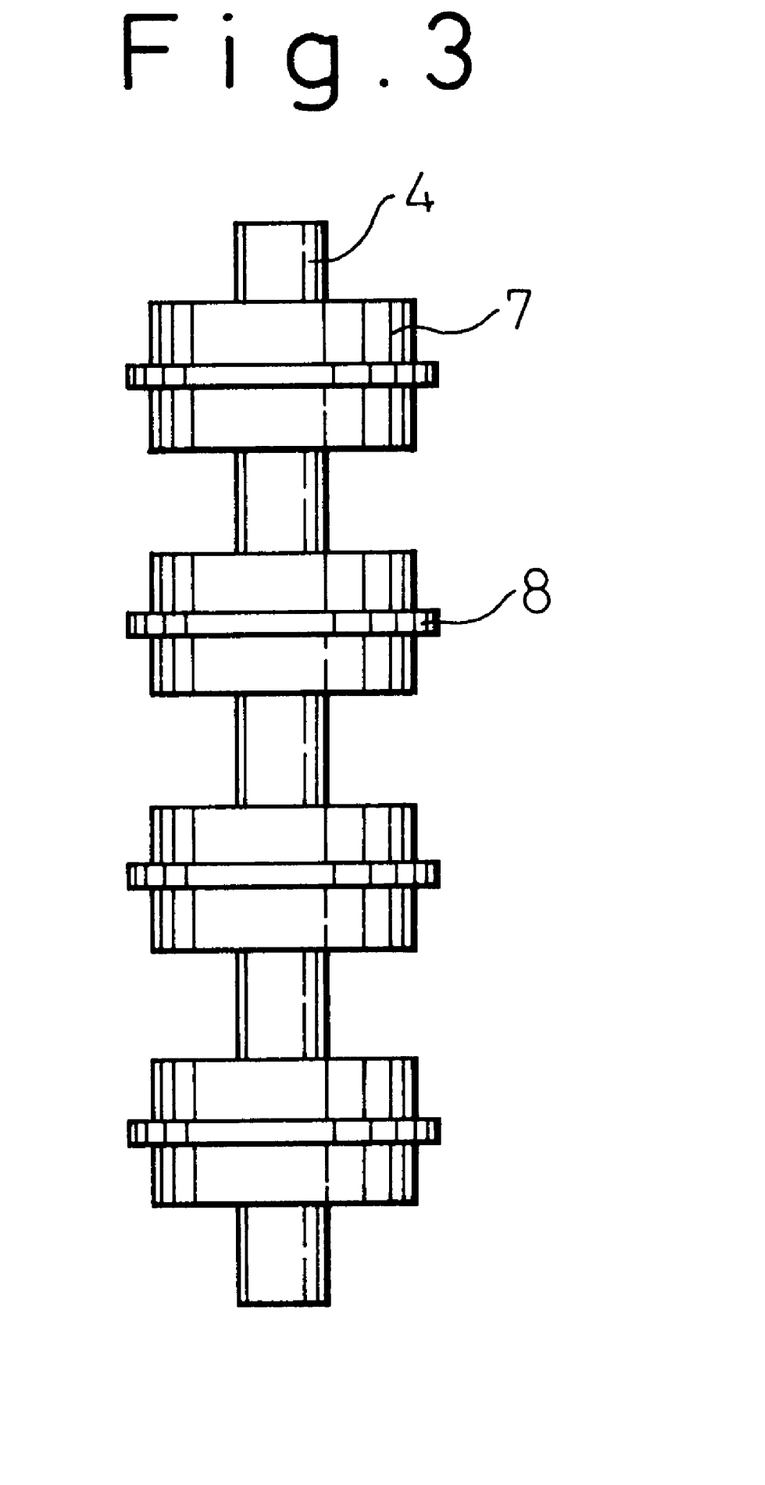
FIG. 3 is a schematic view of an anode having a metal tape fixed by a silicone rubber.

The detail of the anode is shown in FIG. 2. The metal tape 7 wound on the anode rod 4 has a thickness of 0.001 to 0.5 mm, preferably 0.01 to 0.2 mm. The material of the metal tape 7 is preferably silver or a silver alloy, but other materials such as lead, gold, and the like may be used, too. The number of turns of the metal tape is preferably great, and when the metal tape is wound at least two turns, the durability of the anode can be improved to a higher level than an anode using a screw and a nut according to the prior art described above. The metal tape 7 may be merely wound on the anode rod 4, but if necessary, the metal tape 7 may be wound in a ring form using a silicone rubber or a heat-shrinkable tube 8 and may be fixed as shown in FIG. 3. The metal tape 7 need not always have a winding structure but may have a laminate structure wherein several metal tapes are superposed on the anode rod 4 in a longitudinal direction and fixed in such a fashion that the layers do not bond to one another as a whole.

Figure 4:
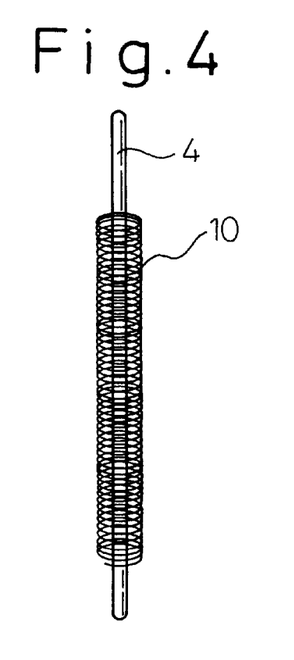
FIG. 4 is a schematic view of an anode having a thin layer of a winding structure of a metal wire.
Figure 5:
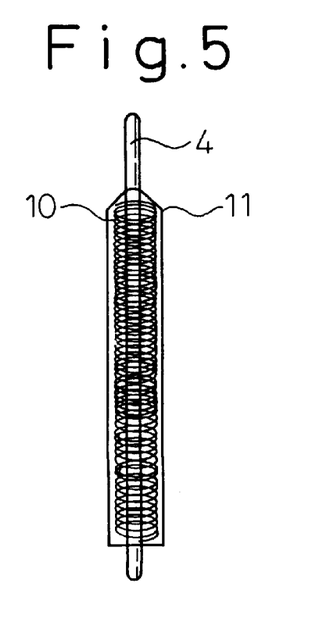
FIG. 5 is a schematic view of an anode having a thin layer of a winding structure of a metal wire which is covered with a flexible net.

Alternatively, a metal wire 10 may be wound on the anode rod 4 in place of the metal tape 7 as shown in FIG. 4. The material of this metal wire 10 is the same as that of the metal tape, and its diameter is from 0.001 to 0.5 mm and preferably, from 0.01 to 0.2 mm. The greater the number of turns of this metal wire 10, the higher the durability of the anode, in the same way as in the case of the metal tape. A mesh produced from this metal wire may be fitted to the anode rod 4 in place of this metal wire 10. When the metal wire or the metal mesh is wound, it may be wound merely on the anode in the same way as in the case of winding of the metal tape. A net 11 having flexibility may be put over the entire portion after the metal wire or the metal mesh is wound so as to retain the anode rod as a whole as shown in FIG. 5, if necessary.

For both the metal tape 7 and the metal wire 10, sodium acetate trihydrate is adhered to the surface thereof and the surface is then polished. According to such a treatment, seed nuclei (clusters) 9 remain on the surface and nucleation becomes easy, see FIG. 2.

Figure 6:
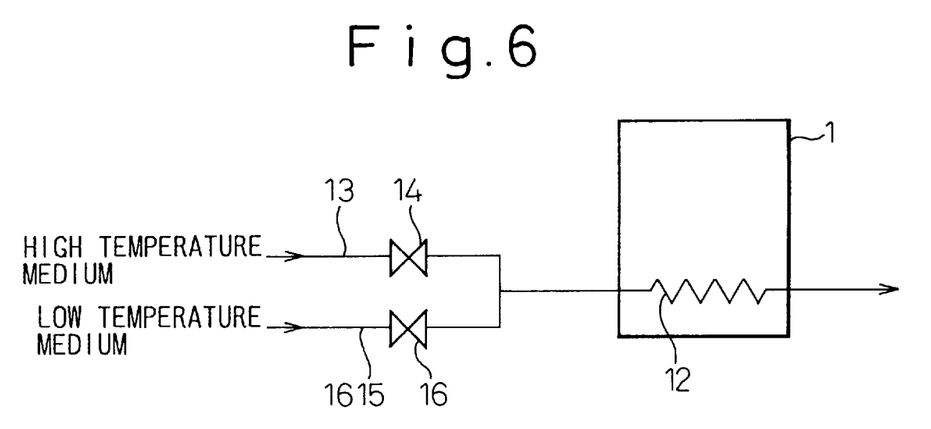
FIG. 6 is an overall view of a heat accumulator.

FIG. 6 shows an overall view of the heat accumulator shown in FIG. 1. Referring to FIG. 6, reference numeral 12 denotes a medium passage so disposed as to come into contact with the heat storage material, reference numeral 13 denotes a high temperature medium feed passage connected to the medium passage 12 through a high temperature medium control valve 14, and reference numeral 15 denotes a low temperature medium feed passage connected to the medium passage 12 through a low temperature medium control valve 16. A medium having a temperature higher than the freezing point (melting point) of the heat storage material 3, that is, about 58° C., is caused to flow through the high temperature medium feed passage 13, and a medium having a temperature lower than the freezing point of the heat storage material 3 is caused to flow through the low temperature medium feed passage 15.

When heat is intended to be stored into the heat storage material, the high temperature medium control valve 14 is opened and the low temperature medium control valve 16 is closed. In this way, the high temperature medium is caused to flow into the medium passage 12. When the high temperature medium flows through the medium passage 12, the heat storage material 3 receives heat from the high temperature medium, and the heat storage material 3 in the solid state is molten to a liquid state. As a result, latent heat is stored in the heat storage material 3. Then, the low temperature medium control valve 16 is opened and high temperature medium control valve 14 is closed, and the low temperature medium flows into the medium passage 12. As a result, the temperature of the heat storage material 3 gradually lowers below the its freezing point. In this case, the heat storage material 3 still remains in a liquid state. In other words, the heat storage material 3 is in a supercooled state, in which latent heat is retained in the heat storage material.

When latent heat is to be evolved from the heat storage material 3, a voltage is applied to the heat storage material 3 from the electrodes disposed in the heat storage material 3 for several seconds or dozens of seconds. As a result, nuclei which promote solidification of the heat storage material 3 occurs in it, so that condensation of the heat storage material is promoted and latent heat can be efficiently evolved from the heat storage material to the low temperature medium. Particularly, the higher nucleation can be secured in the heat storage material 3 by using silver or the silver alloy for the anode rod 4 in this embodiment. It is also possible to carry out this operation in such a manner as to keep the low temperature medium control valve 16, under the cooled state after the high temperature medium control valve 14 is closed, to open the low temperature medium control valve 16 just before evolving heat from the heat storage material 3 and to cause the low temperature medium to flow into the medium passage 12.

When the heat storage material 3 is composed of sodium acetate trihydrate alone and this heat storage material 3 is in a liquid state, $CH_3COO^-$ and hydroxyl ions ($OH^-$) exist in the heat storage material 3 because this sodium acetate trihydrate is a salt of acetic acid (a weak acid) and sodium hydroxide (a strong base). For this reason, when a voltage is applied to the heat storage material 3, the following electrochemical reaction occurs on the surface of the silver anode rod 4 if the anode rod 4 is made of only silver:

$Ag + CH_3COO^- \rightarrow CH_3COOAg + e^-$ (main reaction)

$2Ag + 2OH^- \rightarrow Ag_2O + H_2O + 2e^-$ (side reaction)

Silver acetate ($CH_3COOAg$) produced in this reaction can be dissolved in sodium acetate trihydrate, but silver oxide ($Ag_2O$) is not soluble in sodium acetate trihydrate and remains on the surface of the silver anode rod 4. If the anode consists only of silver, this silver oxide is gradually built up on the anode and it covers the electrode as a whole and nucleation does not occur.

Figure 7A:
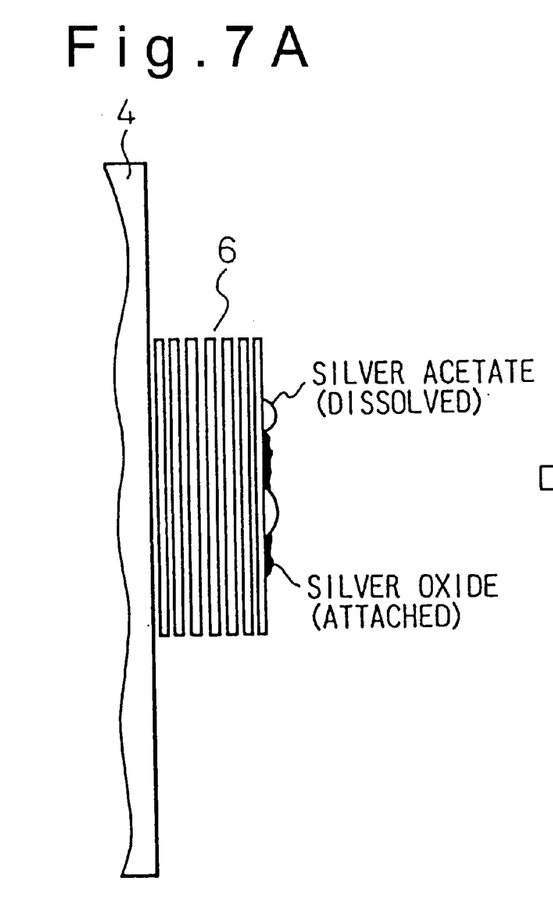
FIGS. 7A–7C are schematic hypothetical views showing the function of oxide layer of a winding structure of a metal tape, with FIG. 7A showing a state in which silver oxide adheres and silver acetate is dissolving, FIG. 7B showing a state in which silver acetate is dissolved and silver oxide remains, and FIG. 7C showing a state in which silver oxide falls.
Figure 7B:
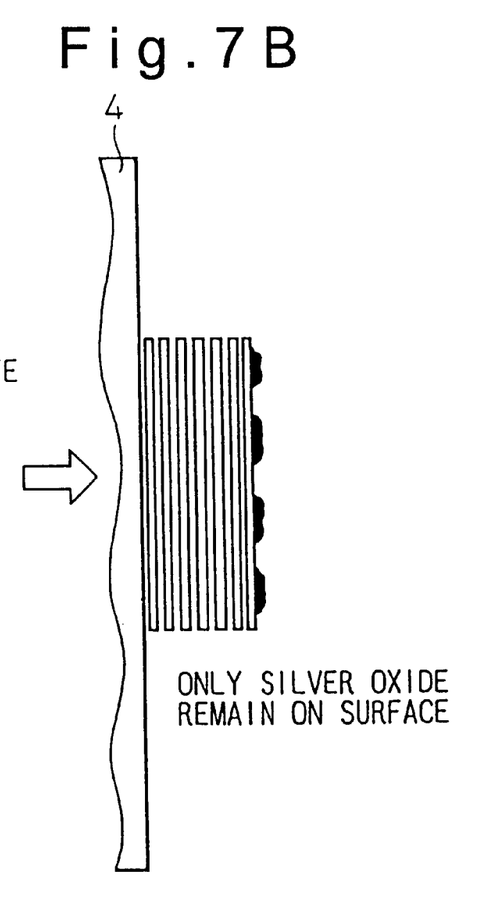
Figure 7C:
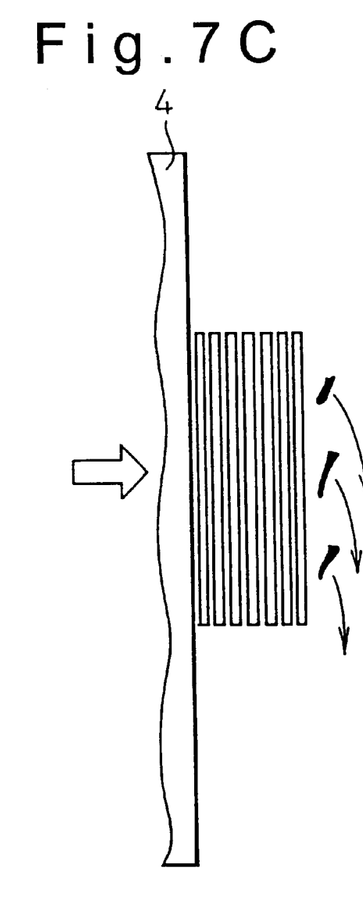

According to the present invention, the silver tape 7 is wound on the anode rod 4 as shown in FIG. 7, and the electrochemical reaction described above occurs on the uppermost layer of this silver tape 7. Although silver oxide adheres to the surface of this tape 7, silver acetate is dissolved in the heat storage material 3 before silver oxide covers the entire surface of the tape as shown in FIG. 7A. As the result, the silver tape 7 of the uppermost layer is consumed as shown in FIG. 7B, and because the layers of the silver tape are not bonded to each other, the silver oxide remaining on the surface loses its support and fall off as shown in FIG. 7C. Then, the new silver tape 7 of the next layer appears. As a result, since the new silver layer always exists on the surface, the anode having the silver tape 7 wound thereon can keep the nucleation function for an extended period.

Figure 8:
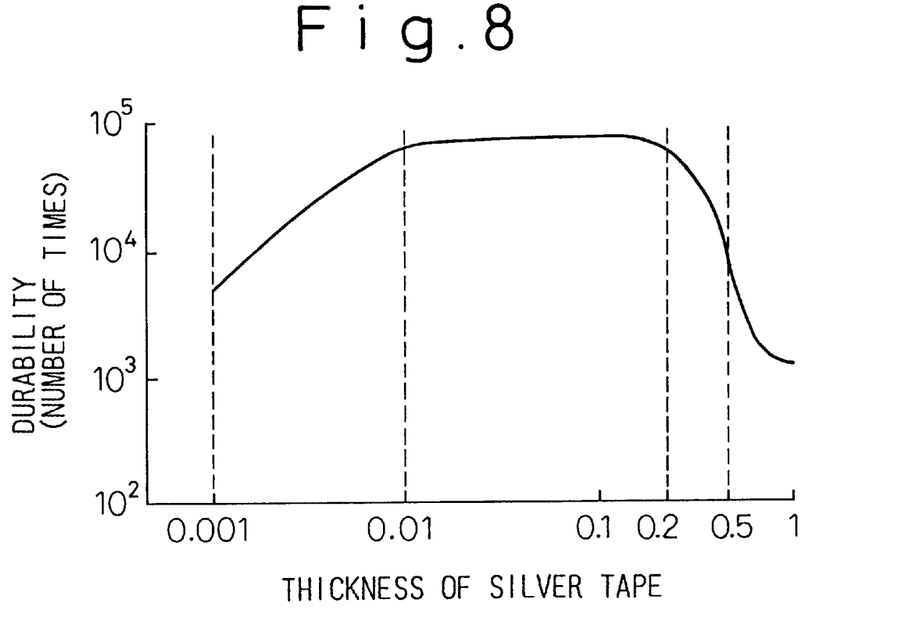
FIG. 8 is a graph showing the relation between the thickness of a silver tape and the number of times of nucleation of a heat accumulator.

FIG. 8 shows the result of measurement of the frequency of nucleation by changing the thickness of the silver tape 7. In this measurement, the frequency of nucleation until the anode loses its nucleation function is measured by repeating the cycles comprising cooling the heat storage material at 0° C. for 10 min., applying a voltage to the electrodes and maintaining the above electrochemical reaction at 90° C. for 30 min. A tape having a width of 5 mm is wound to a thickness of 5 mm as the silver tape 7. After sodium acetate trihydrate is adhered, each silver tape 7 is polished by using sand paper and the clusters are allowed to adhere. As can be clearly understood from FIG. 8, if the thickness of the silver tape is great, silver oxide covers the surface of the silver tape before the tape of the next lower layer appears as a result that the uppermost layer of the silver tape being consumed by the electrochemical reaction, so that nucleation does not occur. Accordingly, the thickness of the tape is preferably not greater than 0.5 mm and more preferably, not greater than 0.2 mm. This thickness is obtained by polishing the silver tape, therefore it is difficult to attain a thickness of below 0.01 mm by this polishing, and processability decreases. Furthermore, it is impossible to attain a thickness of below 0.001 mm.

Figure 9:
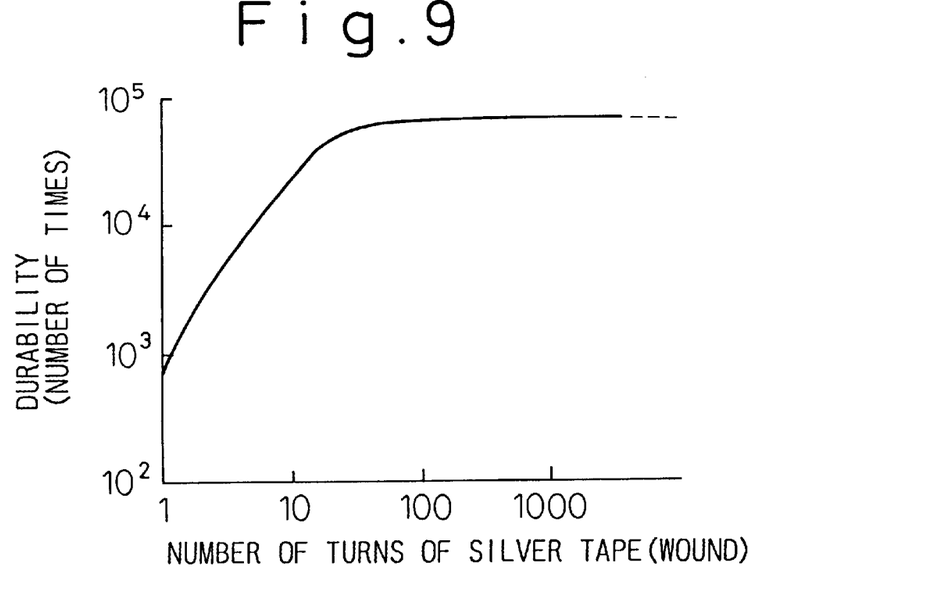
FIG. 9 is a graph showing the relation between the number of turns of a silver tape and the number of times of nucleation of a heat accumulator.

FIG. 9 shows the measurement results of the frequency of nucleation using the same silver tape as described above and changing the number of turns. Durability (frequency of nucleation) can be drastically improved by winding the silver tape several turns and becomes substantially constant above 20 turns.

Figure 10:
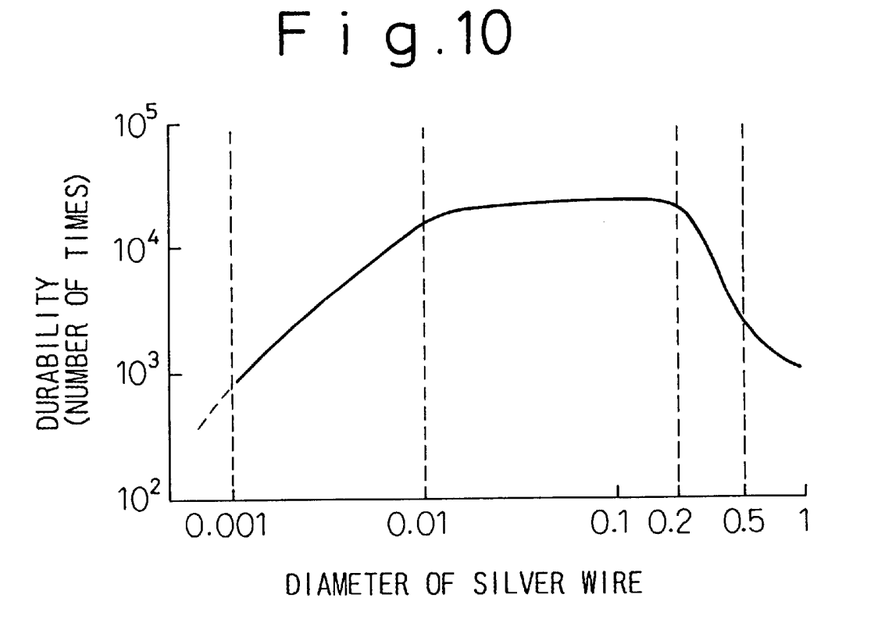
FIG. 10 is a graph showing the relation between the diameter of a silver wire and the number of times of nucleation of a heat accumulator.

FIG. 10 shows the measurement result of the frequency of nucleation by using the silver wire in place of the silver tape and changing its diameter, in the same way as described above. Nucleation does not occur when the diameter (corresponding to the thickness of the silver tape) is great in the same way as in the case of the silver tape. It is difficult to produce silver wires having a diameter of not greater than 0.001 mm.

EXAMPLE 2

Figure 11:
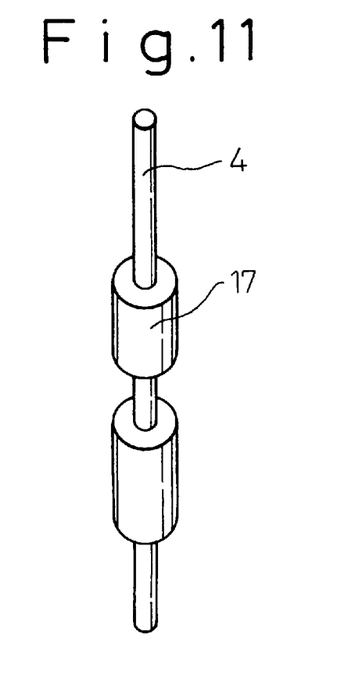
FIG. 11 is a schematic view of an anode equipped with a bonding force variable means.

Another embodiment of the anode equipped with pressing force variable means, used for the heat accumulator of the present invention is shown in FIG. 11. In this anode, a ring-like member 17 of a metal having a linear expansion coefficient smaller than that of the metal of the anode rod 4 is disposed a round the anode rod 4. The sodium acetate trihydrate as the heat storage material is allowed to adhere to the anode rod 4 before this ring-like member 17 is fitted, so as to hold the seed nuclei. Table 1 given below illustrates various metals and their linear expansion coefficients.

TABLE 1

| Material | Linear expansion coefficient (×10$^6$) |
| --- | --- |
| silver | 19.2 |
| chromium | 8.4 |
| molybdenum | 5.5 |
| platinum | 8.0 |
| tantalum | 7.5 |
| zinc | 5.9 |

As shown in this table, if silver is used for the anode rod 4, chromium, molybdenum, platinum, tantalum and zinc can be used for the ring-like member 17. When the anode rod 4 is made of silver, the ring-like member 17 is made of molybdenum and the diameter of the anode rod 4 is 4 mm, the gap between the anode rod 4 and the ring-like member 17 decreases by 3.8 μm when the temperature of the heat storage material rises from 20° C. to 90° C., due to the difference of the linear expansion coefficient of silver and molybdenum. Accordingly, if the gap is 3.8 μm or below when the ring-like member 17 is fitted to the anode rod 4, the gap between the anode rod 4 and the ring-like member 17 does not exist any longer and they come into close contact at a temperature of not lower than 90° C. Then, seed nuclei held in this gap are sealed between the anode rod 4 and the ring-like member 17 and do not come into contact with the heat storage material any longer. Further, because the pressure at that portion rises, the seed nuclei can stably exist even at a high temperature. The temperature for nucleation is from −20 to 20° C. and within this temperature range, the gap exists between the anode rod 4 and the ring-like member 17, and the seed nuclei are in contact with the heat storage material. When a voltage is applied in this temperature range of −20 to 20° C., the heat storage material is easily crystallized with the seed nuclei being the center, so that the latent heat is evolved.

Figure 12:
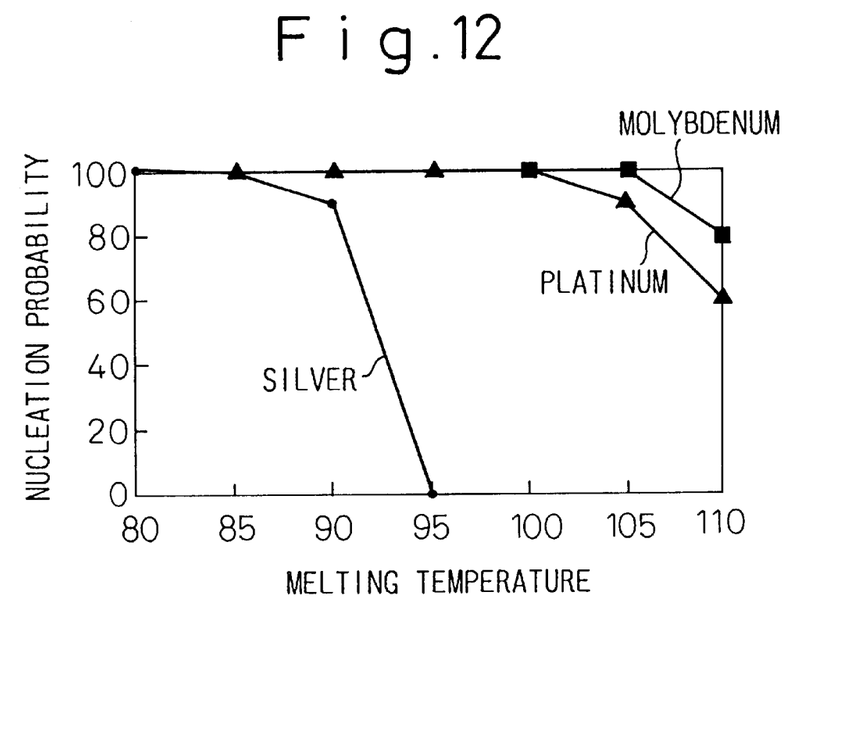
FIG. 12 is a graph showing the relation between nucleation probability and melting temperature using several materials.

A heat accumulator is produced by using silver for the anode rod 4 and silver, platinum and molybdenum for the ling-like member 17, and the relation between the melting temperature and the nucleation probability is examined. The result is shown in FIG. 12. Nucleation occurs at a higher temperature when a material having a smaller linear expansion coefficient is used for the ring-like member 17, and the heat resistance can be improved.

Figure 13:
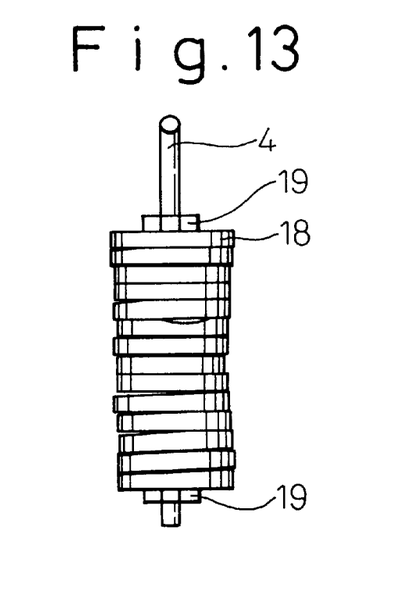
FIG. 13 is a schematic view of an anode equipped with a bonding force variable means.
Figure 14:
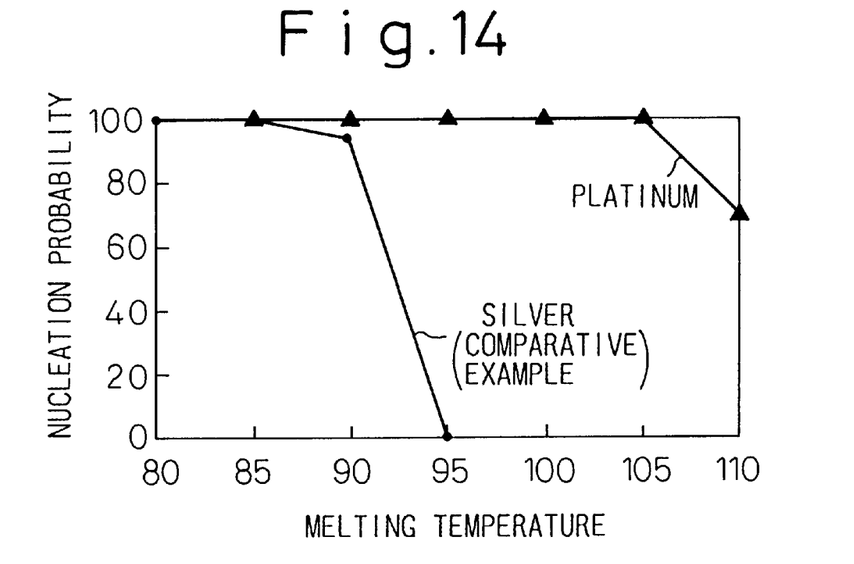
FIG. 14 is a graph showing the relation between nucleation probability and melting temperature using several materials.

An anode equipped with another bonding force variable means is shown in FIG. 13. This anode is produced by penetrating an anode rod 4 having a linear expansion coefficient smaller than that of ring-like members 18 through a plurality of disc-shaped ring-like members 18, and fixing the ring-like members 18 to the anode rod 4 with fastening members 19. The seed nuclei are retained on the surface of the ring-like member so as to facilitate nucleation. In this construction, since the ring-like members 18 are fixed to the anode rod 4 by the fastening members 19, the bonding force in the vertical direction of the ring-like members increases with increasing temperature due to the difference of linear expansion coefficients, and the seed nuclei are separated from the heat storage material. When the temperature is lowered to the nucleation temperature, the bonding force between the ring-like members 19 decreases, and a gap is formed between each of the ring-like members 19. As a result, the seed nuclei can come into contact with the heat storage material and crystallization takes place. The nucleation probability is examined by using platinum and silver for the anode rod 4 and silver for the ring-like member 18 and forming the heat accumulator in the same way as described above. This result is shown in FIG. 14. Whereas the maximum temperature at which a function of the heat accumulator is maintained is 90° C. when both of the anode rod 4 and the ring-like member 19 are made of silver, the above maximum temperature can be improved to 105° C. when the anode rod 4 is made of platinum and the ring-like member 19 is made of silver.

Figure 15:
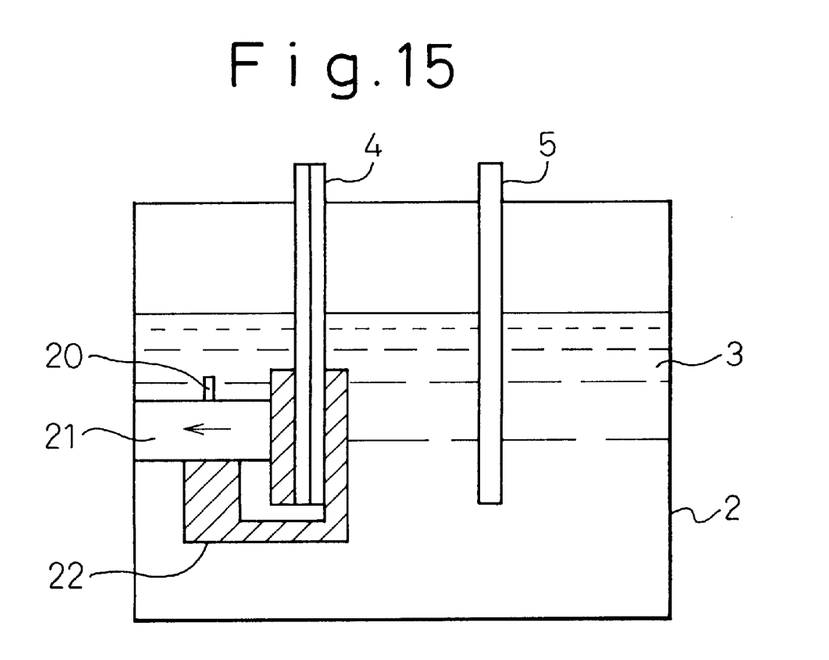
FIG. 15 is a schematic view of a heat accumulator equipped with a pressing force variable means using an actuator.

As described above, when the anode is constituted by two kinds of materials having mutually different linear expansion coefficients, the bonding force can be improved at a high temperature due to the difference of the linear expansion coefficients of the two kinds of materials, the seed nuclei existing between them can be separated from the heat storage material by bringing these two kinds of materials into contact with each other, and heat resistance can thus be improved. Another example of means for varying the pressing force is a means which utilizes an actuator. FIG. 15 shows the heat accumulator equipped with a means for varying the pressing force utilizing this actuator.

In FIG. 15, the anode comprises two silver square rods 4, and the seed nuclei are retained between these two silver square rods. The silver square rods 4 are clamped by a press plate 22 equipped with an actuator 21 which is in turn equipped with a temperature sensor 20. When the temperature is higher than 90° C., the temperature sensor 20 detects this temperature, the actuator 21 begins to operate, and the press plate 22 clamps the silver square rods 4. Then, the gap between the silver square rods is pressed, and the seed nuclei held between them are separated from the heat storage material. As a result, the seed nuclei are not lost even at a high temperature, and the heat resistance can be improved.

EXAMPLE 3

Figure 16:
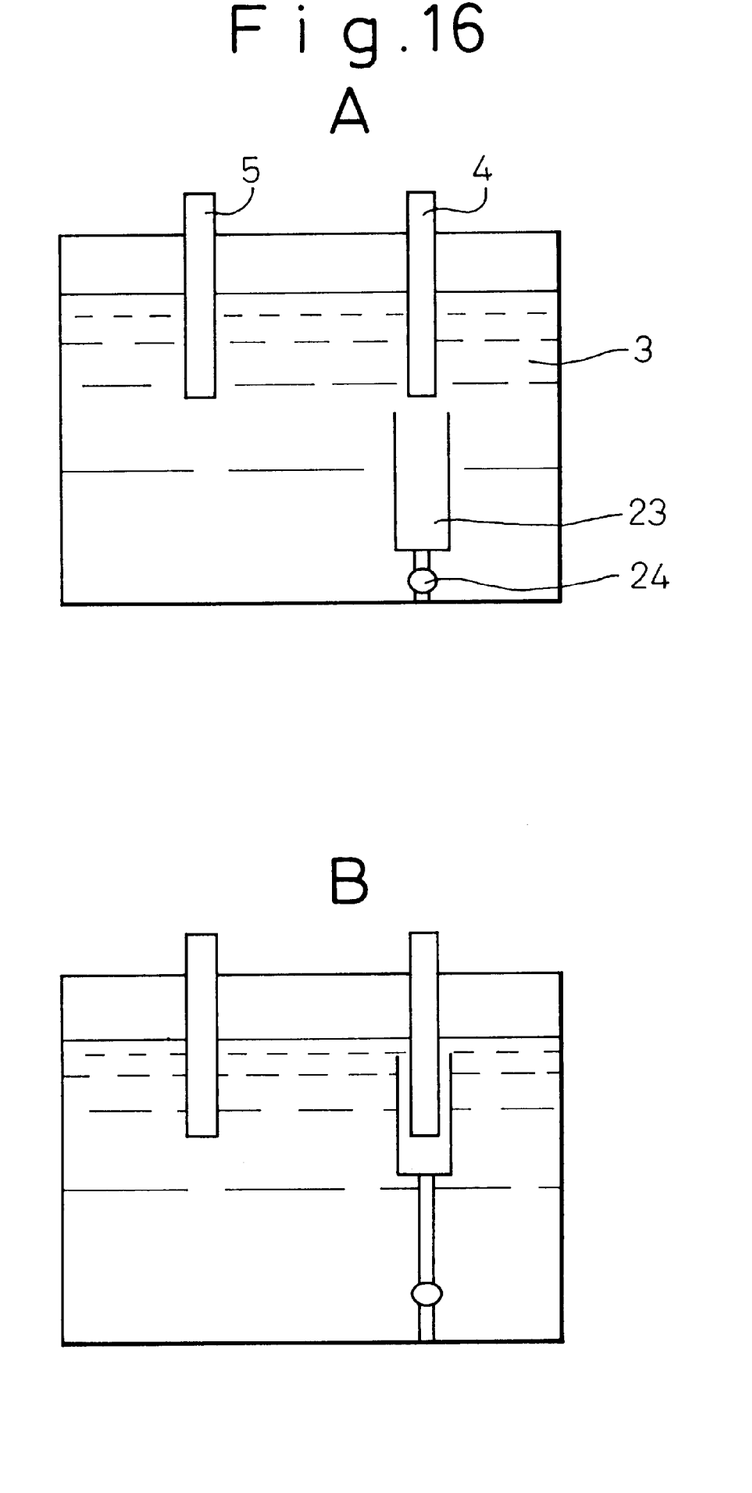
FIGS. 16A and 16B are schematic views of a heat accumulator equipped with an anode separation means, with FIG. 16(A) showing a state in which the anode separation means is apart from the anode at a low temperature, and FIG. 16(B) showing a state in which the anode separation means separates the anode from the heat storage material at a high temperature.

Another embodiment of the heat accumulator equipped with an anode separation means is shown in FIG. 16. The anode rod 4 retains the seed nuclei in the same way as described above. FIG. 16(A) shows the state of nucleation. At this point in time, the anode separation means is apart from the anode rod 4, and the anode rod 4 contacts the heat storage material 3. The linear driving means 24 moves up at high temperatures as shown in FIG. 16(B) and the anode separation means 23 rises, so that the anode rod 4 is separated from the heat storage material 3. Accordingly, the heat transfer from the heat storage material 3 to the anode rod 4 is inhibited, and disappearance of the seed nuclei is prevented. When the heat storage material is again cooled, the state returns to the state shown in FIG. 16(A), and nucleation becomes possible. In this case, the anode separation means 23 is preferably cylindrical structure with a closed bottom having a high heat-insulating property.

Figure 17:
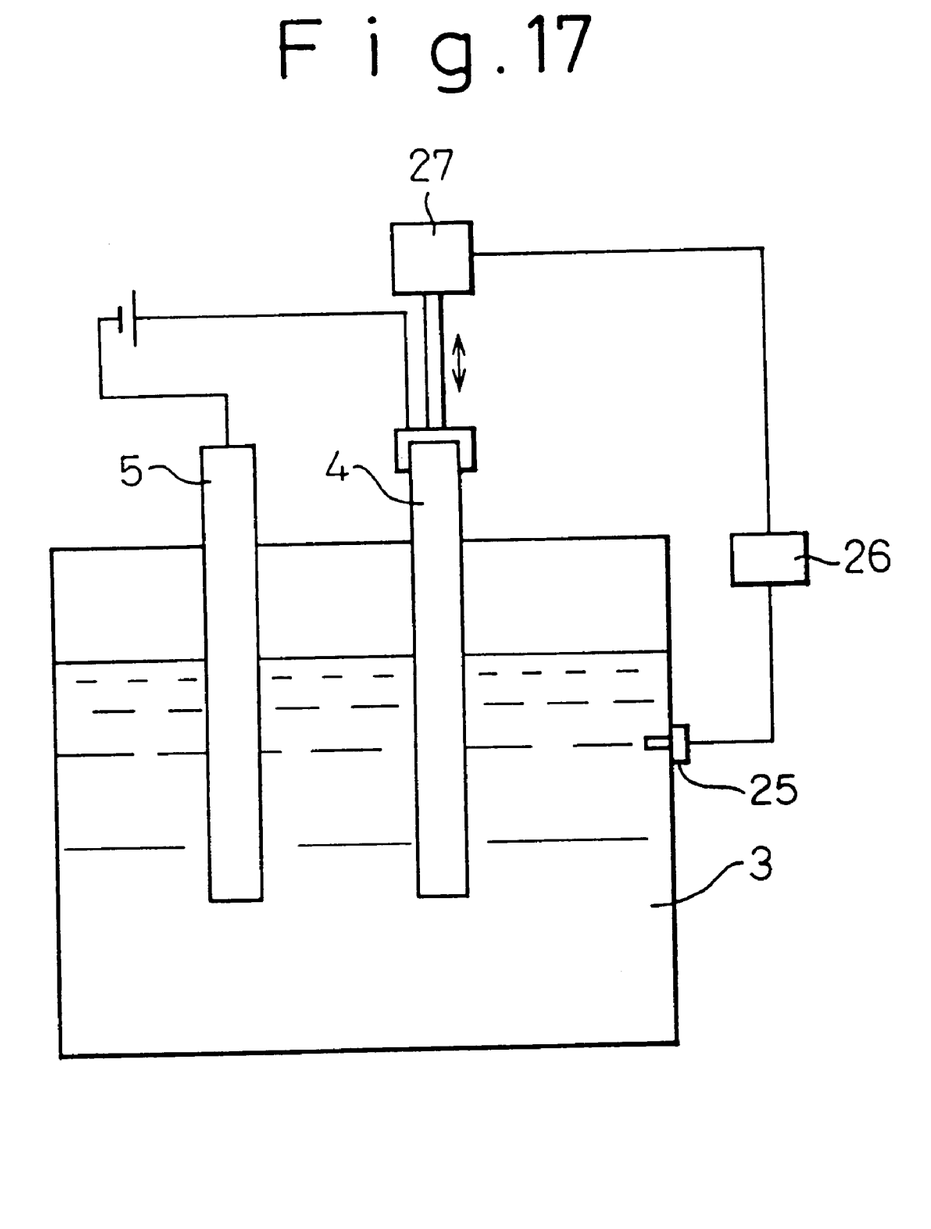
FIG. 17 is a schematic view of a heat accumulator equipped with an anode separation means.

Another example of this anode separation means is shown in FIG. 17. In this example, the anode separation means is fitted to the upper portion of the anode rod 4. The sensor 25 detects the temperature of the heat storage material 3. When the temperature of the heat storage material is low, the anode rod 4 is immersed in the heat storage material, but when the temperature of the heat storage material 3 becomes high, the sensor 25 actuates the actuator 27, so that the anode rod 4 moves up and separates from the heat storage material 3. By this operation, disappearance of the seed nuclei is prevented.

EXAMPLE 4

Figure 18:
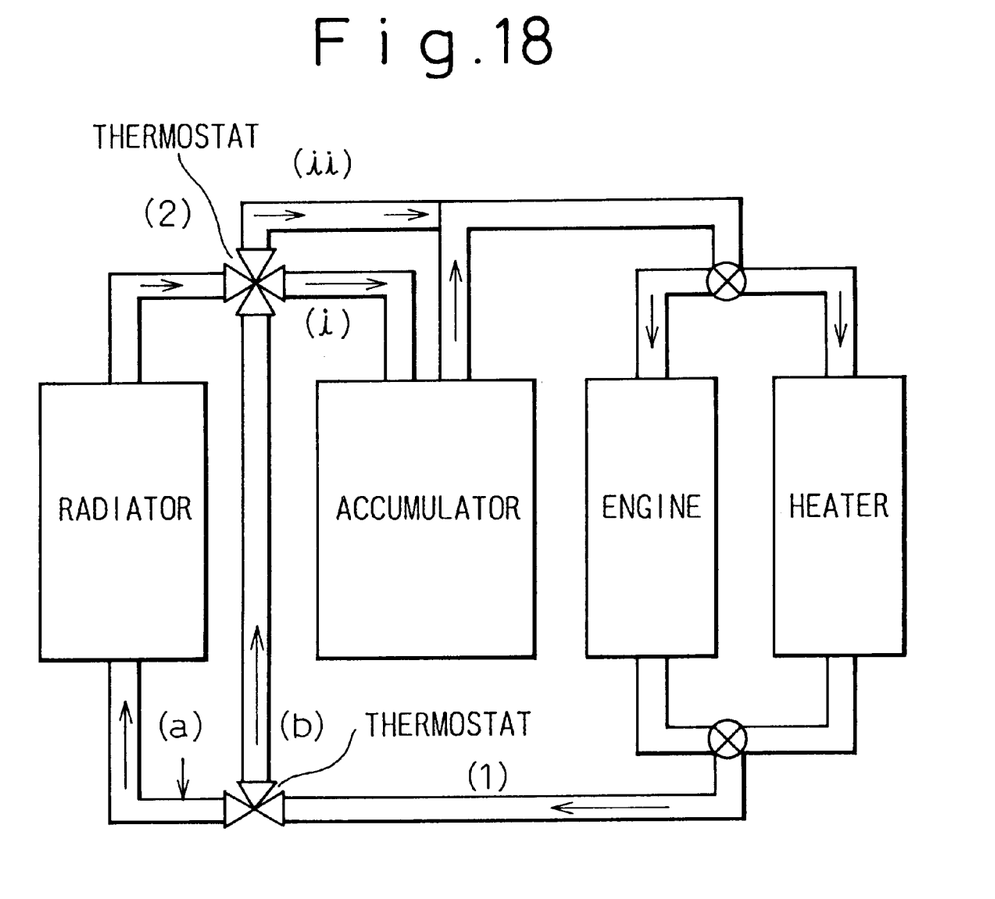
FIG. 18 is a schematic view of a quick warming system using a heat accumulator equipped with a heat feed control means.

A quick warming system using a heat accumulator equipped with heat feed control means is in FIG. 18. When the temperature of engine cooling water is low (below 80° C.) after the engine start, cooling water passing through the engine or the heater passes through (b) and returns to the heat accumulator from (i) through the thermostat (2). As the temperature of cooling water rises and cooling in the radiator becomes necessary, cooling water passes from the thermostat (1) through (a), and flows to (i) through the thermostat (2). As the temperature further rises and the temperature at the thermostat (2) is higher than 90° C., cooling water flows from the thermostat (2) in the direction (ii) in such a manner as to by-pass the heat accumulator and in this way, cooling water having an unnecessarily high temperature is prevented from flowing in. According to this construction, the heat accumulator is prevented from attaining a high temperature, and the decrease of the nucleation function can be prevented.

We claim:

1. A heat accumulator for storing latent heat wherein said latent heat is evolved by applying an electric voltage comprising:

a heat storage material exhibiting a supercooled state in which latent heat is stored;

a pair of spaced electrodes consisting of an anode and a cathode disposed inside said heat storage material;

a multi-layer structure on at least a part of the surface of said anode, which structure is formed from a metal foil or wire and the layers of which are not bonded to one another and have seed nuclei on the surface, and each layer of which has a thickness whereby an outermost layer of said multi-layer structure peels and falls from the adjacent underlying layer when an oxide layer is formed on said outermost layer; and means for applying electric voltage between said anode and cathode.

2. A heat accumulator according to claim 1, wherein said heat storage material is a hydrate of a salt selected from the group consisting of sodium acetate trihydrate ($CH_3COONa \cdot 3H_2O$), calcium chloride hexahydrate ($CaCl_2 \cdot 6H_2O$), sodium sulfate decahydrate ($Na_2SO_4 \cdot 10H_2O$), sodium carbonate decahydrate ($Na_2CO_3 \cdot 10H_2O$), disodium hydrogenphosphate dodecanhydrate ($Na_2HPO_4 \cdot 12H_2O$), calcium nitrate tetrahydrate ($Ca(NO_3)_2 \cdot 4H_2O$), sodium thiosulfate pentahydrate ($Na_2S_2O_3 \cdot 5H_2O$), potassium alum dodecahydrate ($KAl(SO_4)_2 \cdot 12H_2O$), and ammonium alum dodecahydrate ($NH_4Al(SO_4)_2 \cdot 12H_2O$), and said seed nuclei are clusters of said heat storage material.

3. A heat accumulator according to claim 1, wherein said metal foil or wire is made of silver or silver alloy.

4. A heat accumulator according to claim 1, wherein said multi-layer structure is said metal foil and said metal foil has a thickness of not more than 0.5 mm.

5. A heat accumulator according to claim 1, further comprising heat supply control means for cutting off the feed of heat to said heat storage material when the temperature of a medium for supplying heat to said heat storage material or the temperature of said heat storage material exceeds a predetermined temperature.

6. A heat accumulator according to claim 5, wherein said predetermined temperature is a temperature at which the seed nuclei dissolves in the heat storage material.

7. A heat accumulator according to claim 1, wherein said multi-layer structure is said metal wire and said metal wire has a diameter of not more than 0.5 mm.

* * * * *

UNITED STATES PATENT AND TRADEMARK OFFICE
CERTIFICATE OF CORRECTION

PATENT NO. : 5,954,119

DATED : September 21, 1999

INVENTOR(S) : Yamamura et al.

It is certified that error appears in the above-identified patent and that said Letters Patent is hereby corrected as shown below:

Col. 10, line 32, insert --(--, after "(Ca", to read $(Ca(NO_3)_2$.

Signed and Sealed this

Thirtieth Day of May, 2000

Attest:

Q. TODD DICKINSON

*Attesting Officer*         *Director of Patents and Trademarks*